US012615566B2

(12) United States Patent
Liu et al.

(10) Patent No.: US 12,615,566 B2
(45) Date of Patent: Apr. 28, 2026

(54) OFDMA ASSISTED FAST ROAMING IN LABEL SWITCHED MOBILE NETWORKS

(71) Applicant: Cisco Technology, Inc., San Jose, CA (US)

(72) Inventors: Jun Liu, Shanghai (CN); Yaojun Wei, Shanghai (CN); Jianhui Wu, Shanghai (CN); Xia Ke, Shanghai (CN)

(*) Notice: Subject to any disclaimer, the term of this patent is extended or adjusted under 35 U.S.C. 154(b) by 719 days.

(21) Appl. No.: 17/896,701

(22) Filed: Aug. 26, 2022

(65) Prior Publication Data

US 2024/0073759 A1      Feb. 29, 2024

(51) Int. Cl.
H04W 36/08      (2009.01)
H04W 8/02      (2009.01)
H04W 36/00      (2009.01)

(52) U.S. Cl.
CPC .............. H04W 36/08 (2013.01); H04W 8/02 (2013.01); H04W 36/0061 (2013.01); H04W 36/00837 (2018.08)

(58) Field of Classification Search
CPC ............. H04W 36/08; H04W 36/0061; H04W 36/00837; H04W 36/06; H04W 36/0055; H04W 36/302; H04W 8/26; H04W 8/02
USPC .................................. 455/437; 370/329, 331
See application file for complete search history.

(56) References Cited

U.S. PATENT DOCUMENTS

| | | | |
|---|---|---|---|
| 7,394,800 B2 | 7/2008 | Sood et al. | |
| 7,680,079 B2 | 3/2010 | Jeong et al. | |
| 8,380,196 B2 | 2/2013 | Andras et al. | |
| 9,769,708 B2 | 9/2017 | Bisti et al. | |
| 11,044,648 B2 | 6/2021 | Comstock | |
| 2005/0059437 A1* | 3/2005 | Son ................... | H04W 52/0245 |
| | | | 455/574 |
| 2005/0096051 A1* | 5/2005 | Lee ..................... | H04W 36/302 |
| | | | 455/438 |
| 2005/0117539 A1* | 6/2005 | Song ....................... | H04W 8/26 |
| | | | 370/328 |
| 2005/0124345 A1* | 6/2005 | Laroia ................... | H04W 36/06 |
| | | | 455/437 |
| 2009/0232089 A1* | 9/2009 | Lott .................. | H04W 36/0055 |
| | | | 455/437 |

(Continued)

OTHER PUBLICATIONS

"Resource Unit", online: https://en.wikipedia.org/wiki/Resource_ Unit, Aug. 17, 2021, accessed Aug. 11, 2022, 3 pages, Wikimedia Foundation, Inc.

(Continued)

*Primary Examiner* — Jungwon Chang
(74) *Attorney, Agent, or Firm* — Lee & Hayes, P.C.

(57)      ABSTRACT

In one embodiment, a wireless access point receives, from a mobile system, a broadcast beacon that includes a roaming notification indicating that the mobile system intends to roam to the wireless access point. The wireless access point allocates, after receiving the broadcast beacon from the mobile system, an orthogonal frequency-division multiple access resource unit for use by the mobile system. The wireless access point sends a trigger message to the mobile system that includes an indication of the orthogonal frequency-division multiple access resource unit. The wireless access point performs, after sending the trigger message, a handoff exchange with the mobile system using the orthogonal frequency-division multiple access resource unit to attach the mobile system to the wireless access point.

20 Claims, 7 Drawing Sheets

(56) References Cited

U.S. PATENT DOCUMENTS

| | | |
|---|---|---|
| 2018/0020472 A1 | 1/2018 | Lin et al. |
| 2021/0273757 A1* | 9/2021 | Shellhammer ...... H04L 27/2607 |
| 2023/0105571 A1* | 4/2023 | Mohamed ........... H04B 17/318 |
| | | 370/329 |

OTHER PUBLICATIONS

Avdotin, et al., "OFDMA Resource Allocation for Real-Time Applications in IEEE 802.11ax Networks", online: https://arxiv.org/pdf/1909.00603.pdf, Sep. 2, 2019, 3 pages, arXiv.org.

Kim, et al., "IEEE P802.11 Wireless LANs", Doc: IEEE 802.11-17/0353r2, Mar. 2017, 4 pages, LG Electronics.

* cited by examiner

OFDMA ASSISTED FAST ROAMING IN LABEL SWITCHED MOBILE NETWORKS

TECHNICAL FIELD

The present disclosure relates generally to computer networks, and, more particularly, to orthogonal frequency-division multiple access (OFDMA)-assisted fast roaming in label-switched mobile networks.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication. However, cellular technologies are typically not practical for certain scenarios involving fast moving nodes, such as trains. Thus, backhauling in these types of deployments typically rely on using Wi-Fi between mobile nodes and access points (APs) distributed along the path of travel. However, the performance of the connection between the mobile system and the wireless backhaul network is largely contingent on the ability of the mobile system to seamlessly roam from one AP to another during its travels. This is particularly true in the case of a fast moving mobile system, such as a train, as the signal with its current AP can rapidly degrade due to its movement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
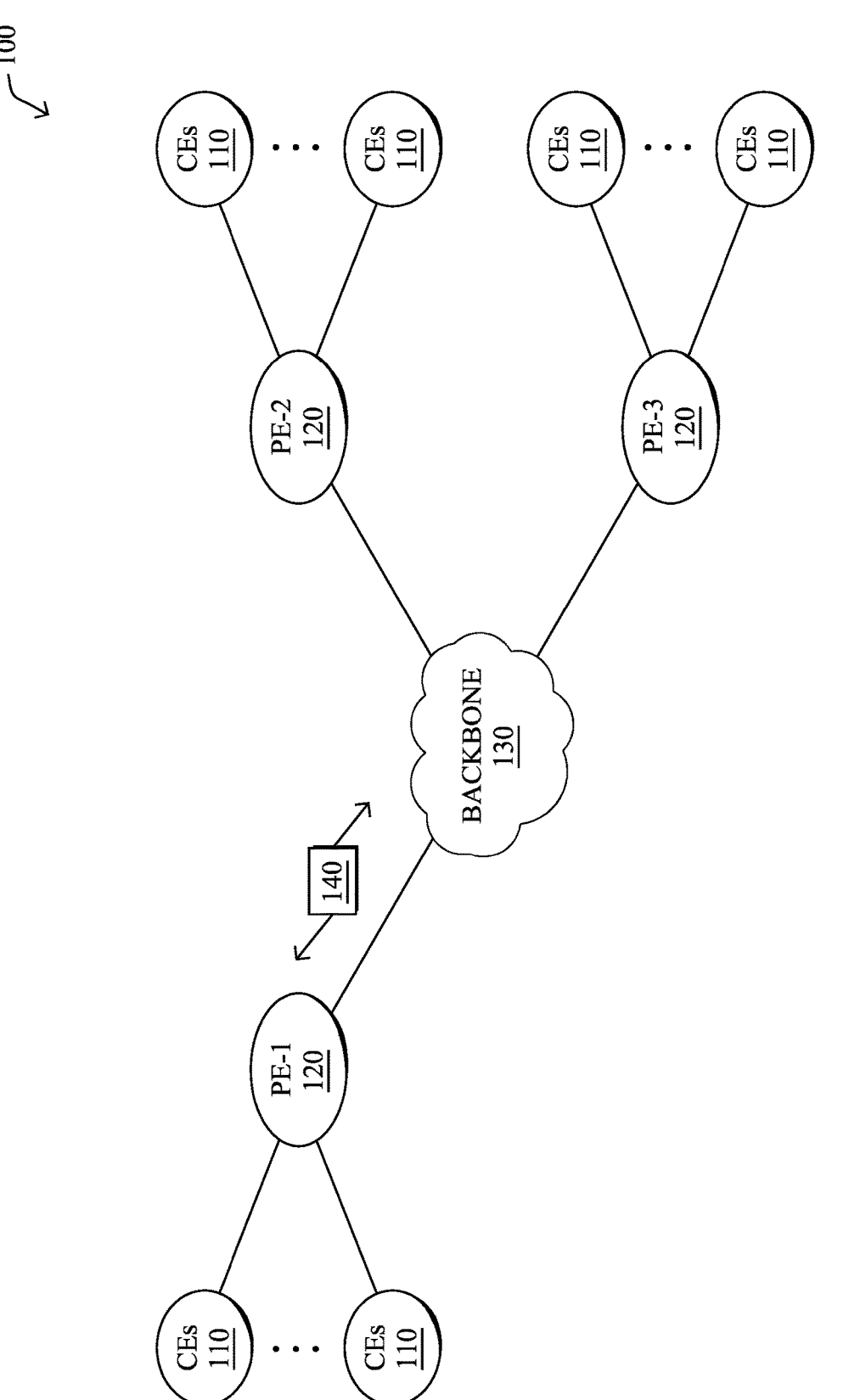
FIGS. 1A-1B illustrate an example communication network.

According to one or more embodiments of the disclosure, a wireless access point receives, from a mobile system, a broadcast beacon that includes a roaming notification indicating that the mobile system intends to roam to the wireless access point. The wireless access point allocates, after receiving the broadcast beacon from the mobile system, an orthogonal frequency-division multiple access resource unit for use by the mobile system. The wireless access point sends a trigger message to the mobile system that includes an indication of the orthogonal frequency-division multiple access resource unit. The wireless access point performs, after sending the trigger message, a handoff exchange with the mobile system using the orthogonal frequency-division multiple access resource unit to attach the mobile system to the wireless access point.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
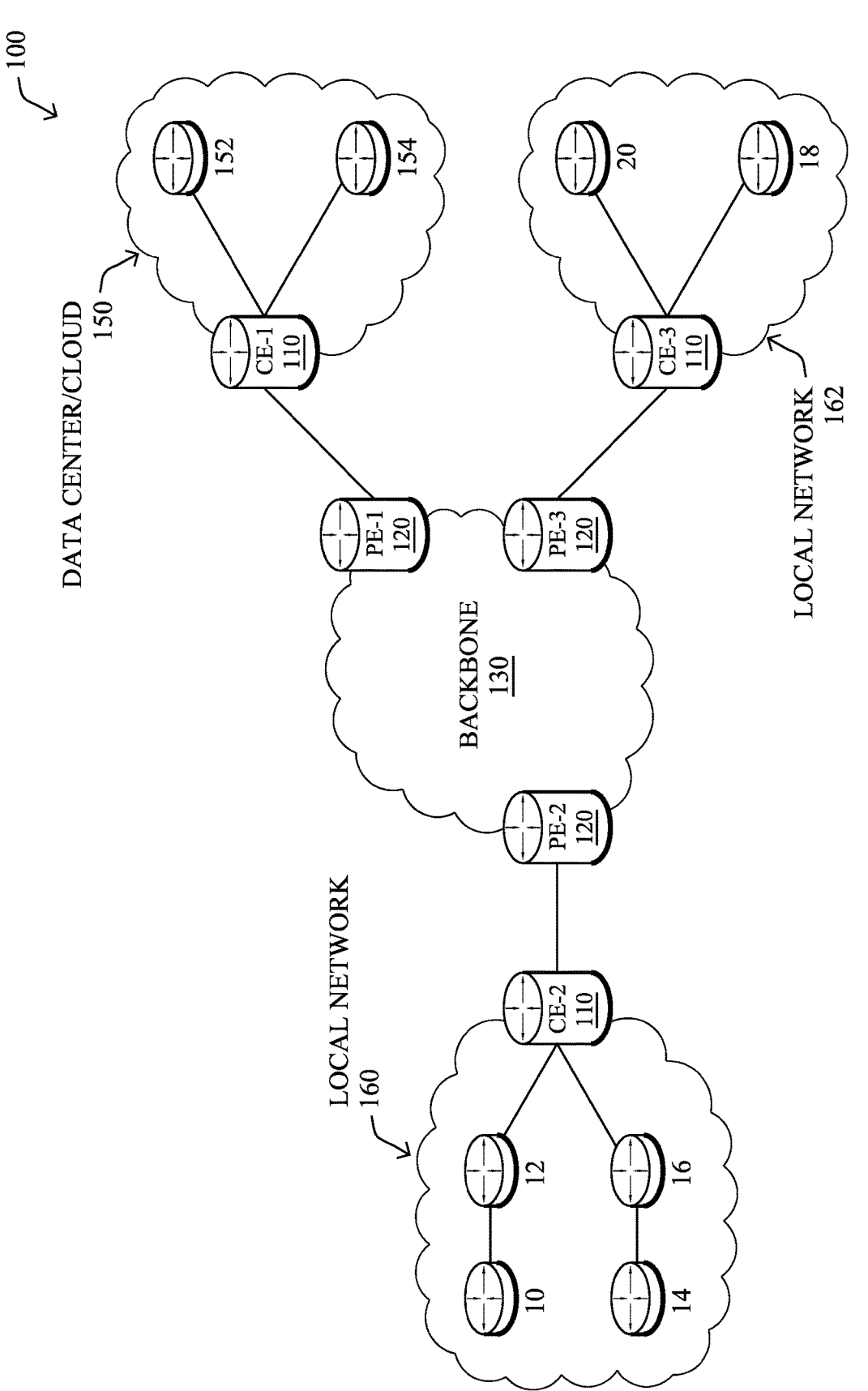

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
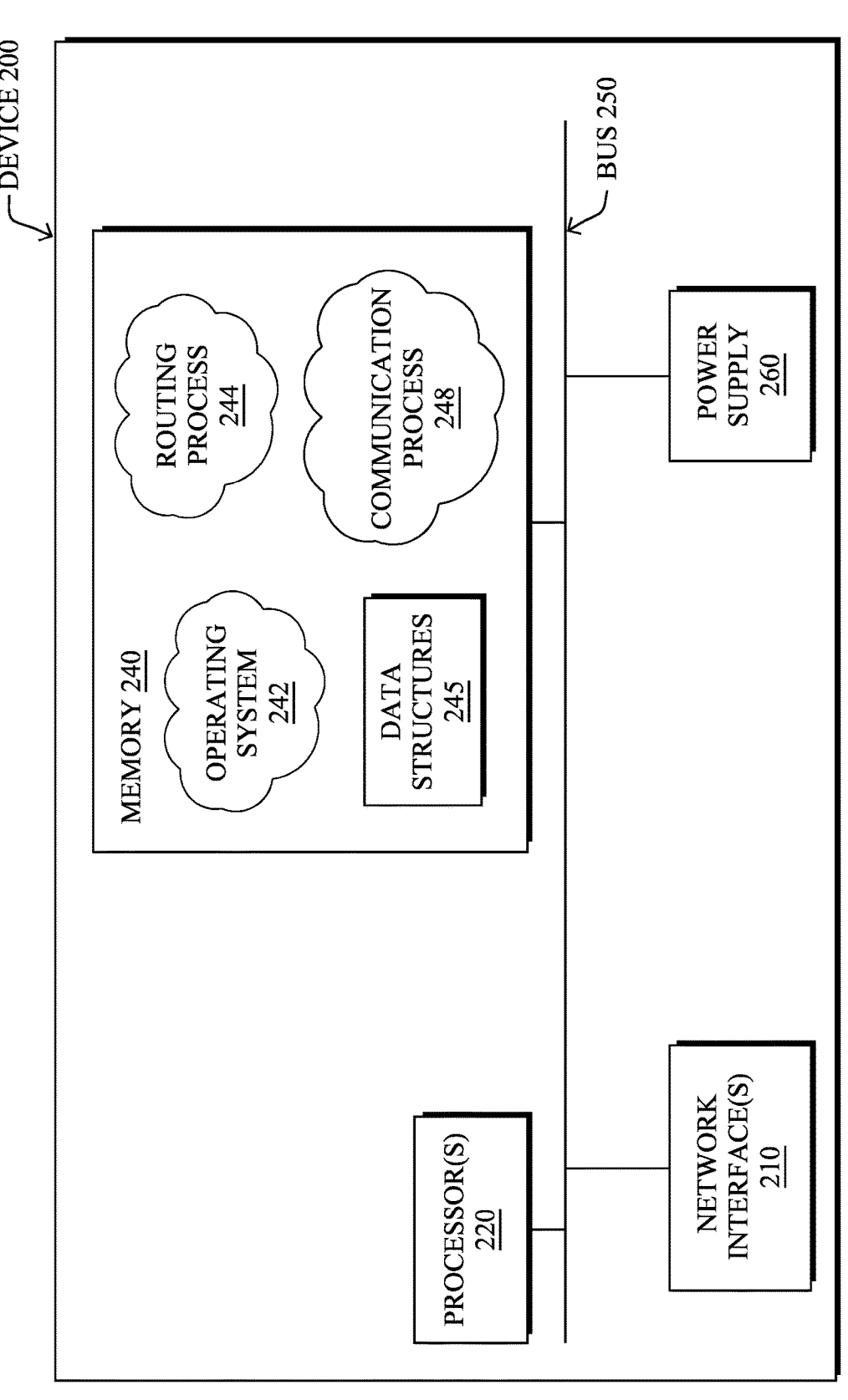
FIG. 2 illustrates an example network device/node.

FIG. 2 is a schematic block diagram of an example node/device 200 (i.e., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein (e.g., to select a wireless transmission rate). To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample wireless metrics labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
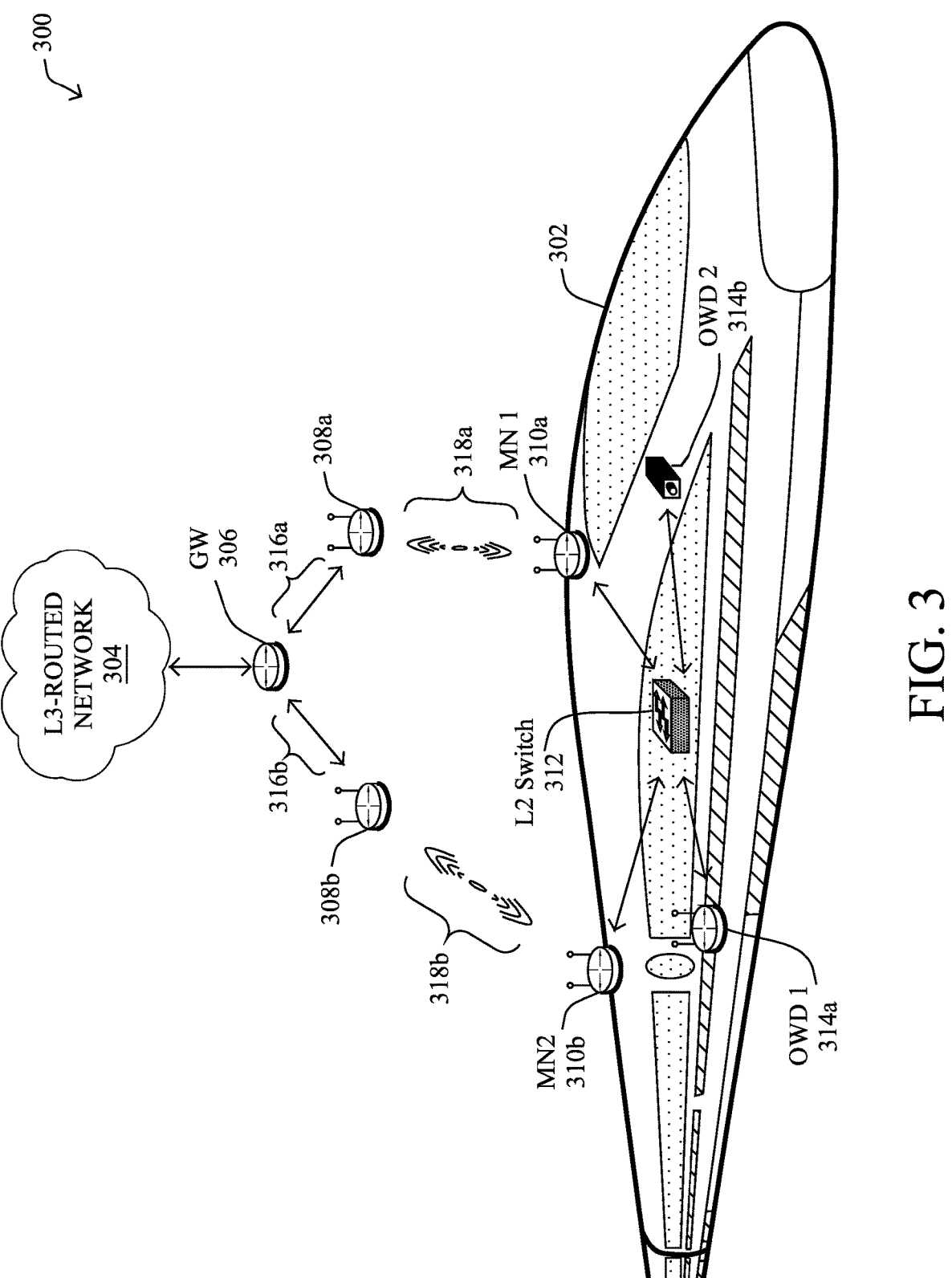
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314*a* may take the form of an onboard Wi-Fi access point that provides connectivity to any number of user devices (e.g., mobile phones, computers, etc.) of passengers being transported by mobile system 302. Conversely, onboard device 314*b* may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310*a* and a second MN 310*b*. Each MN 310 may generally include: 1.) a wireless interface to exchange data with wireless access points of the backhaul network and 2.) a local interface to exchange data with the local network of mobile system 302. For instance, MN 310*a* and MN 310*b* may each have a wired connection to L2 switch 312.

As would be appreciated, MN 310*a* and MN 310*b* may be located on mobile system 302 at a distance from one another, so as to provide spatial diversity to the potential wireless connection points utilized by mobile system 302. For example, MN 310*a* may be located near the front of mobile system 302 (e.g., the head-end of a train), while MN 310*b* may be located farther towards the rear of mobile system 302 than that of MN 310*a*. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308*a*-308*b* shown. Note that while these wireless access points are referred to herein as 'trackside,' their locations can be varied depending on the deployment scenario (e.g., roadside, etc.).

During operation, base stations 308*a*-308*b* may form wireless connections with MN 310*a* and/or MN 310*b*, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308*a*-308*b* and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310*a* has formed a wireless connection 318*a* with base station 308*a*. Such a connection may be formed using a suitable transmission protocol, such as the Prodigy protocol by Fluidmesh (now Cisco Systems) or another wireless protocol that supports extremely fast handoffs. Consequently, MN 310*a* may establish a first tunnel over wireless connection 318*a*. GW 306 and base station 308*a* may form a second tunnel via their connection 316*a*, likewise. Thus, when base station 308*a* sends traffic that it receives from MN 310*a* towards GW 306, it may encapsulate the traffic and tunneled via the first tunnel, which base station 308*a* then encapsulates for transport via the second tunnel to GW 306. A similar approach may be taken with respect to wireless connection 318*b* between MN 310*b* and base station 308*b*, as well as connection 316*b* between base station 308*b* and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308*a* over which traffic conveyed between base station 308*a* and MN 310*a* may be transported, assuming that wireless connection 318*a* exists. Similarly, another GW 306 and base station 308*b* may form a second L2 tunnel over which traffic conveyed between base station 308*b* and MN 310*b* may be transported, assuming that wireless connection 318*a* exists.

Typically, only a single wireless link is active at any given time between a mobile system, such as mobile system 302, and any given base station 308. For instance, assume that MN 310*a* is wirelessly connected to base station 308*a*. In such a case, any other MN 310 on mobile system 302 (e.g., MN 310*b*, etc.) may be in an idle state at that time. In other words, one of the mobile nodes (e.g., MN 310*a*) may be designated as the primary, while the other is designated as the secondary (e.g., MN 310*b*) and remains idle. As mobile system 302 roams, the primary node may begin passing its traffic to the secondary node, to begin leveraging its own connection to the fixed infrastructure. In turn, the roles of the two nodes may be switched, thereby making MN 310*a* the secondary node and MN 310*b* the primary node.

As noted above, utilizing label switched paths in the backhaul of the mobile network allows for make-before-break roaming of fast-moving mobile systems. In general, such a deployment includes a primary domain with multiple label switched nodes and a mobile domain with mobile label switched nodes, whereby the mobile domain is movable with respect to the primary/backhaul domain. Packet routing between these two domains is performed by way of a selected primary border node (e.g., an AP) and a selected mobile border node, and a handoff procedure is executed that establishes a label switched connection between the primary border node and the mobile border node.

Typically, the handoff messages in the above network consist of a pair of Request (REQ) and Response (RES) messages and initiated by a mobile node (e.g., MN 310) of the mobile system. These custom messages may be sent via 802.11 data frames and transmitted within the total channel bandwidth in the 20 MHz band. However, as wireless solutions move to higher bandwidth deployments (e.g., using 80 MHz or 160 MHz) and mass clients, the loss and collision probabilities of the REQ and RES messages also increases. In addition, the roaming coverage distance is also reduced due to noise on these higher bandwidth channels. Further, collisions may occur during roaming between full bandwidth roaming messages and orthogonal frequency-division multiple access (OFDMA) sub-channels, thereby degrading roaming performance.

——OFDMA-Assisted Fast Roaming in Label-Switched Mobile Networks——

The techniques introduced herein provide for OFDMA-assisted fast roaming in mobile networks, particularly those that rely on LSPs for purposes of make-before-break fast roaming.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a wireless access point receives, from a mobile system, a broadcast beacon that includes a roaming notification indicating that the mobile system intends to roam to the wireless access point. The wireless access point allocates, after receiving the broadcast beacon from the mobile system, an orthogonal frequency-division multiple access resource unit for use by the mobile system. The wireless access point sends a trigger message to the mobile system that includes an indication of the orthogonal frequency-division multiple access resource unit. The wireless access point performs, after sending the trigger message, a handoff exchange with the mobile system using the orthogonal frequency-division multiple access resource is unit to attach the mobile system to the wireless access point.

Figure 4:
FIG. 4 illustrates an example of a mobile system performing an exchange with a base station/access point.
Figure 4:
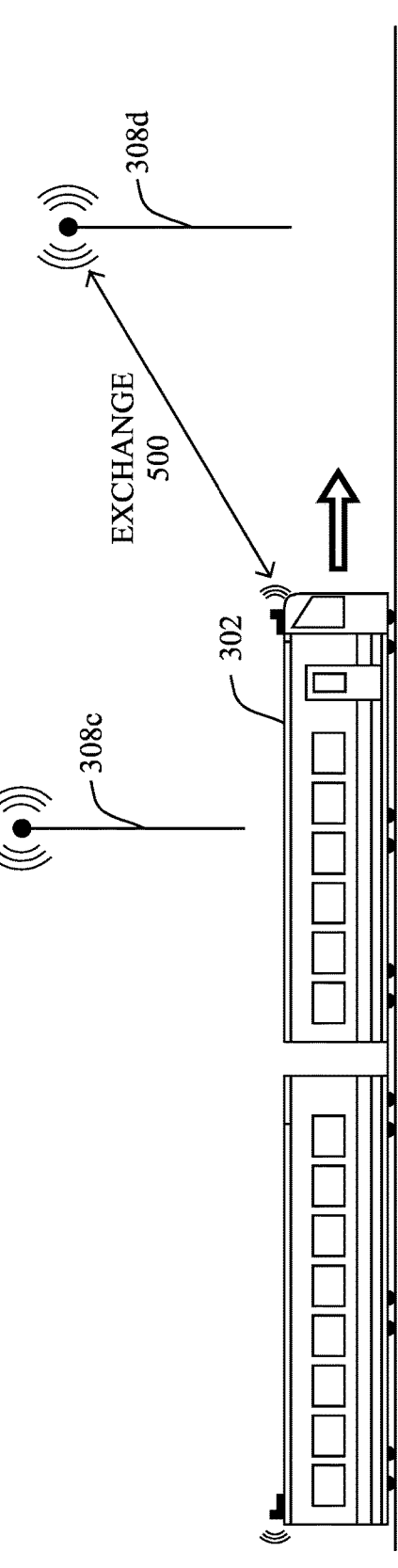

Operationally, FIG. 4 illustrates an example 400 of a mobile system 302 performing an exchange with a base station/access point, according to various embodiments. As shown, assume that mobile system 302 is moving in a particular direction along a path of travel (e.g., a railway) and is currently attached to an AP/base station 308*c*. As would be appreciated, as mobile system 302 moves away from base station 308*c*, the wireless signal between the two will begin to degrade. At some point, this means that the connection with base station 308*c* will degrade to the point where it begins to impinge on the traffic sent to and/or from mobile system 302.

Thus, mobile system 302 may perform an exchange 500 with an upcoming AP/base station 308, such as base station 308*d*, prior to losing connectivity with base station 308*c*. However, as noted above, as wireless networks move to frequencies that offer higher bandwidth (e.g., 80 MHz, 160 MHz, etc.), this also increases the potential for collisions to occur during the exchange of REQ and RES messages as part of exchange 500.

Figure 5:
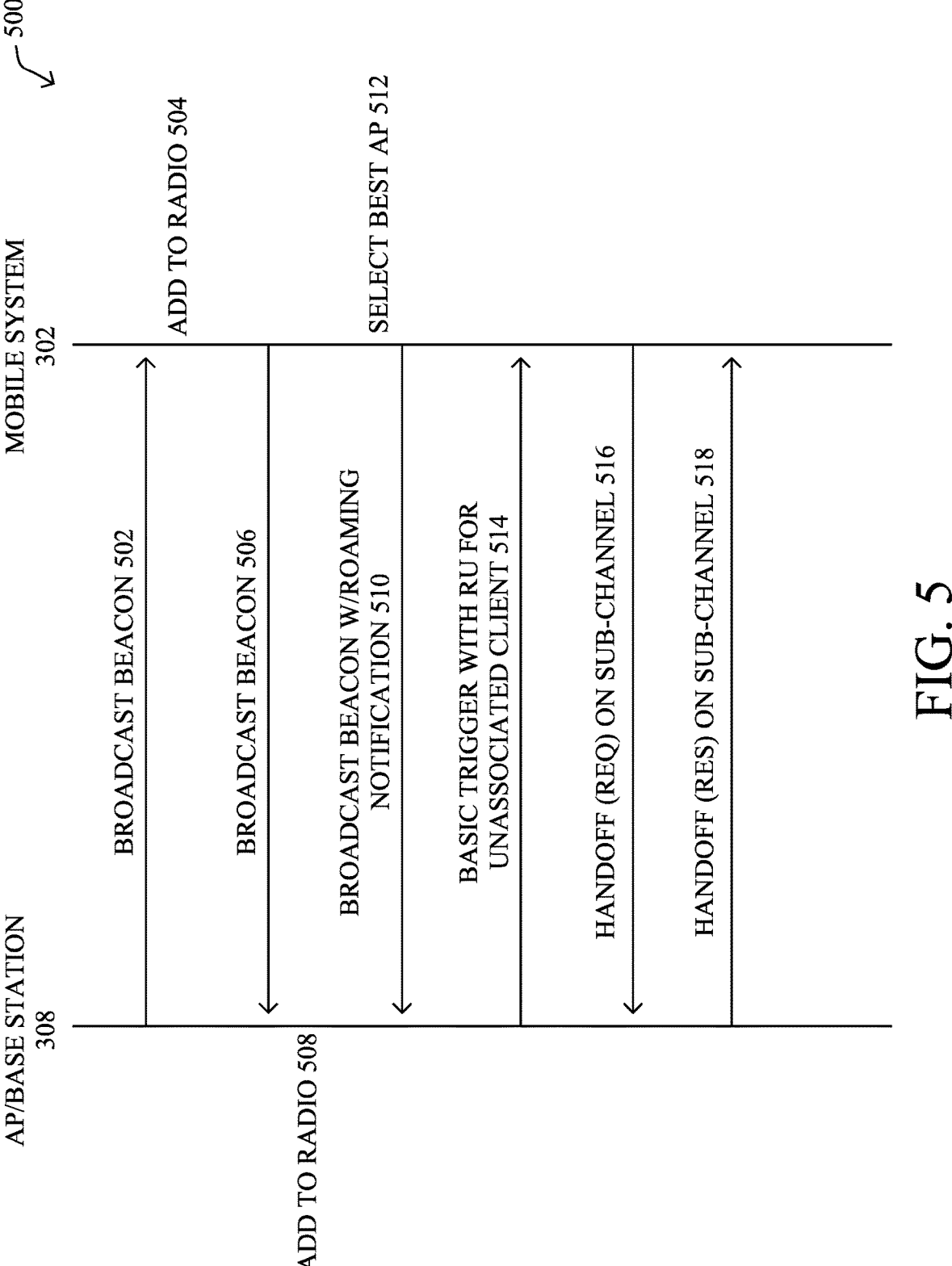
FIG. 5 illustrates an example diagram of a wireless exchange between a mobile system and a base station/access point.

According to various embodiments, FIG. 5 illustrates an example diagram of wireless exchange 500 between a mobile system 302 and an AP/base station 308. As shown, exchange 500 may begin through the use of 802.11 data frame beacons that allow mobile system 302 and base station 308 to learn the presences of one another. Note that this initial beaconing is only intended for the two devices to learn that the other is within communication range and does not establish an association/attachment between mobile system 302 and base station 308. To perform the actual roaming, mobile system 302 and base station 308 will still need to exchange REQ/RES messages. In some embodiments, the decision to roam may rest with mobile system 302, which may send a REQ message to what it considers to be the 'best' AP as its roaming target.

More specifically, as shown, exchange 500 may begin by base station 308 broadcasting a beacon 502 that announces its presence to any nearby devices. Typically, base station 308 may send out beacons, periodically, so as to announce its presence to any mobile systems that that have moved into its range. Another purpose of beacon 502 is to allow mobile system 302 to assess the performance of the wireless signal with base station 308. For instance, mobile system 302 may also capture the performance metric(s) associated with beacon 502, such as a received signal strength indicator (RSSI), signal-to-noise ratio (SNR), on receipt of it.

When mobile system 302 is within range of base station 308, it may receive beacon 502, thereby learning the presence of base station 308. In turn, at step 504, mobile system 302 may add base station 308 to its radio driver, thereby recording the details of beacon 502, such as its RSSI, etc.

Similarly, mobile system 302 may also broadcast its own beacon 506, to indicate its presence to base station 308. In turn, at step 508, base station 308 may also add the details of mobile system 302 and the performance of its own beacon 506 to its own radio driver.

At this point, both mobile system 302 and base station 308 are now aware of one another and roaming may be initiated between the two. Typically, in a preferred embodiment, the roaming decision may be made by mobile system 302. However, the roaming decision could also be initiated by base station 308, in further embodiments. For instance, mobile system 302 may decide to initiate roaming with base station 308 based on the performance metric(s) from beacon 502 (e.g., RSSI, etc.), the physical location of mobile system 302 (e.g., based on a GPS coordinate or other location identifier), combinations thereof, or the like. In more advanced embodiments, mobile system 302 may also leverage machine learning to select the 'optimal' AP with which to roam and/or the point in time at which the roaming should be initiated. Of course, such techniques could also be performed by the backhaul network, as well.

Once mobile system 302 has decided to initiate roaming to base station 308 at step 512, it may broadcast a beacon 510 to 308 that includes a roaming notification, in various embodiments. In some embodiments, beacon 510 may be of a similar form as its own beacon 506, but now extended to include a custom field that indicates to base station 308 that mobile system 302 intends to roam to base station 308. In various embodiments, for instance, beacon 510 may include the Basic Service Set Identifier (BSSID) of base is station 308 and/or a buffer status report (BSR) subfield. Once mobile system 302 has finished roaming to base station 308, it may stop including this roaming notification in its beacons.

Receipt of beacon 510 with a roaming notification by base station 308 allows base station 308 to learn of the intent of mobile system 302 to roam to it, prior to the roaming operation taking place. In various embodiments, beacon 510 may then cause base station 308 to pre-allocate a low noise, OFDMA resource unit (RU) for use when communicating with mobile system 302. As would be appreciated, such an RU may correspond to a specific sub-channel on the wireless band used by base station 308.

In turn, base station 308 may send a trigger frame 514 to mobile system 302 that indicates the RU selected by base station 308. Such a trigger frame 514 may then prompt mobile system 302 to send a handoff request (REQ) message 516 to base station 308 on the sub-channel/RU indicated by trigger frame 514 and allocated by base station 308. Similarly, base station 308 may then return a handoff response (RES) message 518 to mobile system 302 on that sub-channel/RU, thereby completing the roaming handoff. As would be appreciated, by completing the handoff exchange of messages 516-518 on this optimal sub-channel, the roaming performance (e.g., roaming coverage distance, success ratio, etc.), could be improved by selecting such a narrow band transmission.

In some embodiments, among the APs that may receive beacon 510, the AP with which mobile system 302 is currently attached may simply ignore the BSR field and do nothing for this already associated client. For instance, as in FIG. 5, base station 308c may receive a beacon sent by mobile system 302 that includes a BSR (and/or the BSSID of base station 308d), and simply take no further action. Within a typical roaming area, there will likely be only a few APs that will receive a beacon with this new field. By matching the indicated BSSID in the beacon from mobile system 302 to that of the receiving AP, only the AP having a matching BSSID may start the RU allocation for mobile system 302, to improve overall channel efficiency.

In a further embodiment, the AP whose BSSID matches that of beacon 510, such as base station 308 in FIG. 5, may initiate an uplink OFDMA random access (UORA) is process by assigning an 'optimal' RU to an unattached/unassociated client (e.g., an RU with a higher SNR and lower collision probability). Similar to traditional Wi-Fi operations, base station 308 may signal the allocated RU in trigger frame 514, which includes one or more user information fields. For UORA within standard Wi-Fi, association identifier (AID) 2045 may be allocated for unassociated clients and an OFDMA backoff (OBO) mechanism started on the side of mobile system 302.

For UORA within a wireless solution that relies on the formation of LSPs as part of the roaming process, such as the one described above, each AP may allocate a client AID without centralized control, as it has already been notified that an unassociated client is intending to roam to it. So, in some implementations, an unassociated client can identify an allocated sub-channel by an allocated AID within a basic trigger frame, rather than AID 2045, by which there will be no backoff delay and collision between unassociated client as seen for AID 2045.

In some embodiments, base station 308 may use the BSR information in beacon 510, to select an RU to allocate for mobile system 302. For instance, in one embodiment, if there are already OFDMA transmissions on base station 308, base station 308 may reduce the RU already allocated to its associated client(s) and some of them may be reserved for incoming roaming. Some of the associated/attached clients may also contend on AID 0, to ensure successful roaming by mobile system 302, which has a higher priority. If there is no OFDMA transmission on base station 308, base station 308 may start the UORA process or scheduled UL-OFDMA process, with the unassociated client (mobile system 302) always using the allocated AID, as described above, switch over to OFDMA transmission, or still contend, as with Enhanced Distributed Channel Access (EDCA).

As would be appreciated, the allocation of different sub-channels/RUs for purposes of performing the roaming handoff exchange between mobile system 302 and base station 308 helps to avoid possible collisions, such as by simultaneous roaming from different clients. In some embodiments, the maximum number of roaming RUs could also be limited to a smaller number (e.g., 2-3), to increase channel efficiency. In one is embodiment, if base station 308 determines that the roaming handoff has not happened within a predefined amount of time, it may re-allocate some or all of the reserved RU for use by its currently associated/attached client(s).

Figure 6:
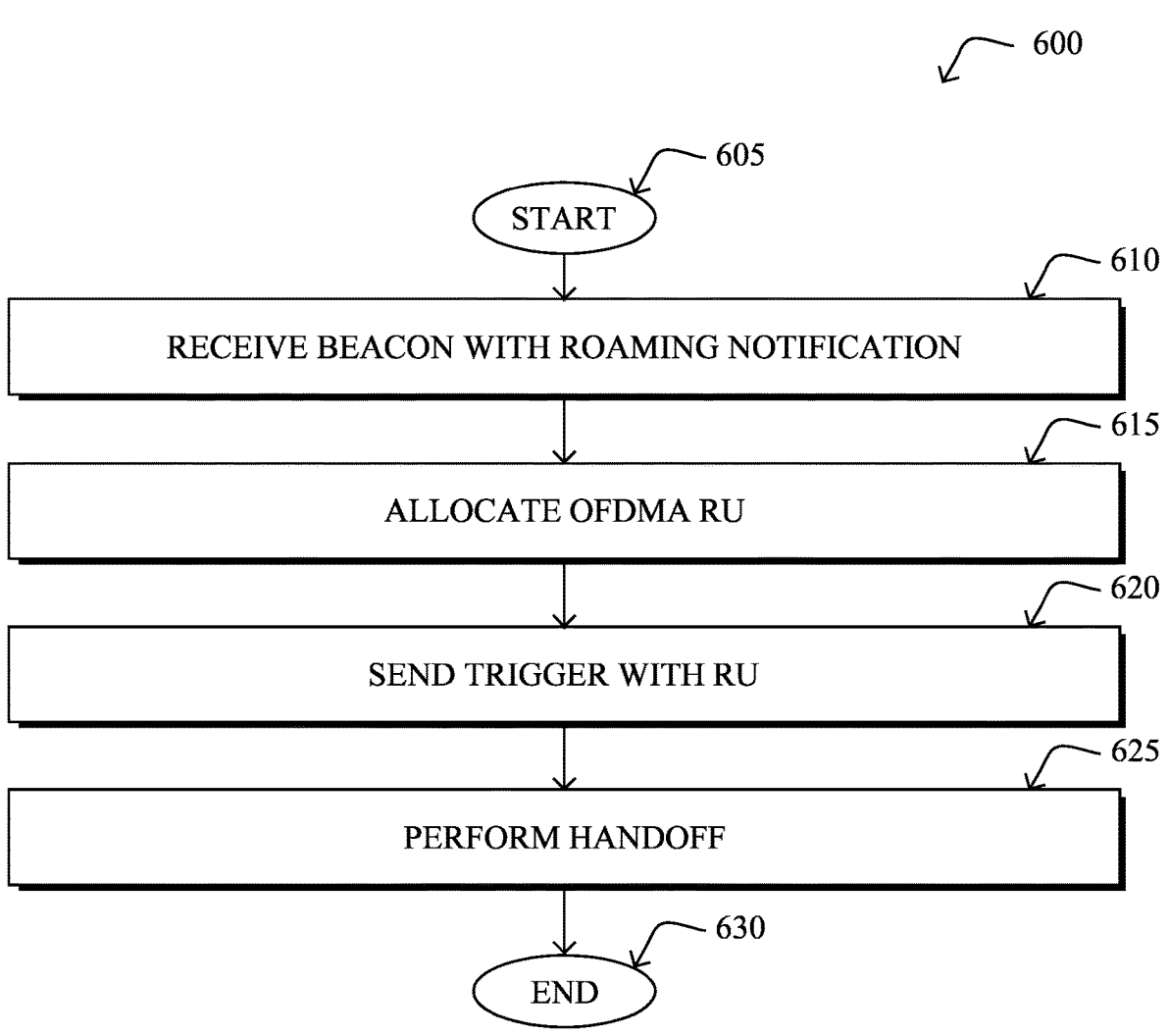
FIG. 6 illustrates an example simplified procedure for orthogonal frequency-division multiple access (OFDMA)-assisted fast roaming in label-switched mobile networks.

FIG. 6 illustrates an example simplified procedure (e.g., a method) for orthogonal frequency-division multiple access (OFDMA)-assisted fast roaming in label-switched mobile networks, in accordance with one or more embodiments described herein. The procedure 600 may start at step 605, and continues to step 610, where, as described in greater detail above, a device in a wireless network (e.g., a device 200), such as a wireless access point, may receive, from a mobile system, a broadcast beacon that includes a roaming notification indicating that the mobile system intends to roam to the wireless access point. In some embodiments, the roaming notification of the broadcast beacon from the mobile system comprises a basic service set identifier (BSSID) of the wireless access point. In a further embodiment, the roaming notification comprises a buffer status report. In some embodiments, the mobile system comprises a passenger vehicle or an autonomous vehicle.

At step 615, as detailed above, the wireless access point may allocate, after receiving the broadcast beacon from the mobile system, an orthogonal frequency-division multiple access resource unit for use by the mobile system. In some embodiments, the orthogonal frequency-division multiple access resource unit is a wireless sub-channel. In one embodiment, the wireless access point selects the orthogonal frequency-division multiple access resource unit based in part on the buffer status report. In a further embodiment, the wireless access point selects the orthogonal frequency-division multiple access resource unit from among a set of resource units reserved on the wireless access point for use with roaming clients.

At step 620, the wireless access point may send a trigger message to the mobile system that includes an indication of the orthogonal frequency-division multiple access resource unit, as described in greater detail above. For instance, the wireless access point may indicate a selected sub-channel to the mobile system via the trigger message.

At step 625, as detailed above, the wireless access point may perform, after is sending the trigger message, a handoff exchange with the mobile system using the orthogonal frequency-division multiple access resource unit to attach the mobile system to the wireless access point. In some embodiments, the wireless access point may do so by receiving a handoff request from the mobile system using the orthogonal frequency-division multiple access resource unit and sending a handoff response to the mobile system. In further embodiments, the handoff exchange establishes a label-switched path between the wireless access point and the mobile system. In some embodiments, mobile system stops including the roaming notification in its broadcast beacons after performing the handoff exchange with the wireless access point.

Procedure 600 then Ends at Step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for OFDMA-assisted fast roaming in label-switched mobile networks, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be is implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

receiving, at a wireless access point and from a mobile system, a broadcast beacon that includes a roaming notification indicating that the mobile system intends to roam to the wireless access point;

allocating, by the wireless access point and after receiving the broadcast beacon from the mobile system, an orthogonal frequency-division multiple access resource unit comprising a sub-channel within a single wireless frequency channel for use by the mobile system;

sending, by a wireless transmission from the wireless access point, a trigger message to the mobile system while the mobile system is unassociated with the wireless access point, the trigger message identifying the orthogonal frequency-division multiple access resource unit allocated by the wireless access point for uplink transmission by the mobile system during a handoff exchange; and performing, by the wireless access point and after sending the trigger message, the handoff exchange with the mobile system using the orthogonal frequency-division multiple access resource unit to attach the mobile system to the wireless access point.

2. The method as in claim 1, wherein the orthogonal frequency-division multiple access resource unit is a wireless sub-channel.

3. The method as in claim 1, wherein the roaming notification of the broadcast beacon from the mobile system comprises a basic service set identifier (BSSID) of the wireless access point.

4. The method as in claim 1, wherein performing the handoff exchange with the mobile system comprises:

receiving a handoff request from the mobile system using the orthogonal frequency-division multiple access resource unit; and sending a handoff response to the mobile system.

5. The method as in claim 1, wherein the handoff exchange establishes a label-switched path between the wireless access point and the mobile system.

6. The method as in claim 1, wherein the roaming notification comprises a buffer status report.

7. The method as in claim 6, wherein the wireless access point selects the orthogonal frequency-division multiple access resource unit based in part on the buffer status report.

8. The method as in claim 1, wherein the wireless access point selects the orthogonal frequency-division multiple access resource unit from among a set of resource units reserved on the wireless access point for use with roaming clients.

9. The method as in claim 1, wherein mobile system stops including the roaming notification in its broadcast beacons after performing the handoff exchange with the wireless access point.

10. The method as in claim 1, wherein the mobile system comprises a passenger vehicle or an autonomous vehicle.

11. An apparatus, comprising:

one or more interfaces to communicate with a wireless network;

a processor coupled to the one or more interfaces that is configured to execute one or more processes; and a memory configured to store a process that is executable by the processor, the process when executed configured to:

receive, from a mobile system, a broadcast beacon that includes a roaming notification indicating that the mobile system intends to roam to the apparatus;

allocate, after receiving the broadcast beacon from the mobile system, an orthogonal frequency-division multiple access resource unit comprising a sub-channel within a single wireless frequency channel for use by the mobile system;

send, by a wireless transmission from the apparatus, a trigger message to the mobile system while the mobile system is unassociated with the apparatus, the trigger message identifying the orthogonal frequency-division multiple access resource unit allocated by the apparatus for uplink transmission by the mobile system during a handoff exchange; and perform, after sending the trigger message, the handoff exchange with the mobile system using the orthogonal frequency-division multiple access resource unit to attach the mobile system to the apparatus.

12. The apparatus as in claim 11, wherein the orthogonal frequency-division multiple access resource unit is a wireless sub-channel.

13. The apparatus as in claim 11, wherein the roaming notification of the broadcast beacon from the mobile system comprises a basic service set identifier (BSSID) of the apparatus.

14. The apparatus as in claim 11, wherein the apparatus performs the handoff exchange with the mobile system by:

receiving a handoff request from the mobile system using the orthogonal frequency-division multiple access resource unit; and sending a handoff response to the mobile system.

15. The apparatus as in claim 11, wherein the handoff exchange establishes a label-switched path between the apparatus and the mobile system.

16. The apparatus as in claim 11, wherein the roaming notification comprises a buffer status report.

17. The apparatus as in claim 16, wherein the apparatus selects the orthogonal frequency-division multiple access resource unit based in part on the buffer status report.

18. The apparatus as in claim 11, wherein the apparatus selects the orthogonal frequency-division multiple access resource unit from among a set of resource units reserved on the apparatus for use with roaming clients.

19. The apparatus as in claim 11, wherein mobile system stops including the roaming notification in its broadcast beacons after performing the handoff exchange with the apparatus.

20. A tangible, non-transitory, computer-readable medium storing program instructions that cause a wireless access point to execute a process comprising:

receiving, at the wireless access point and from a mobile system, a broadcast beacon that includes a roaming notification indicating that the mobile system intends to roam to the wireless access point;

allocating, by the wireless access point and after receiving the broadcast beacon from the mobile system, an orthogonal frequency-division multiple access resource unit comprising a sub-channel within a single wireless frequency channel for use by the mobile system;

sending, by a wireless transmission from the wireless access point, a trigger message to the mobile system while the mobile system is unassociated with the wireless access point, the trigger message identifying the orthogonal frequency-division multiple access resource unit allocated by the wireless access point for uplink transmission by the mobile system during a handoff exchange; and performing, by the wireless access point and after sending the trigger message, the handoff exchange with the mobile system using the orthogonal frequency-division multiple access resource unit to attach the mobile system to the wireless access point.

* * * * *